(12) United States Patent
Meine et al.

(10) Patent No.: US 9,689,411 B2
(45) Date of Patent: Jun. 27, 2017

(54) ASSEMBLY FOR CLAMPING AND GROUNDING OBJECTS

(75) Inventors: Shawn J. Meine, Phoenix, AZ (US); John S. Ash, Phoenix, AZ (US)

(73) Assignee: Ironridge, Inc., Hayward, CA (US)

( * ) Notice: Subject to any disclaimer, the term of this patent is extended or adjusted under 35 U.S.C. 154(b) by 457 days.

(21) Appl. No.: 13/542,570

(22) Filed: Jul. 5, 2012

(65) Prior Publication Data
US 2014/0010616 A1   Jan. 9, 2014

(51) Int. Cl.
*F16B 7/04* (2006.01)
*B25G 3/20* (2006.01)
*F16B 2/00* (2006.01)
*F16B 2/12* (2006.01)
*F16B 7/18* (2006.01)
*F16B 43/00* (2006.01)

(52) U.S. Cl.
CPC ............... *F16B 2/12* (2013.01); *F16B 7/187* (2013.01); *F16B 43/00* (2013.01); *Y10T 403/7062* (2015.01)

(58) Field of Classification Search
CPC ......... Y10T 403/4668; Y10T 403/4677; Y10T 403/4681; Y10T 403/4682; Y10T 403/4674; Y10T 403/4665; Y10T 403/7062; F16B 2/12; F16B 7/187; F16B 43/00
USPC .......... 403/373, 376, 379.3, 408.1; 52/173.1, 52/173.3, 698, 705; 411/81, 84, 85, 106, 411/107, 108, 109, 187, 188; 248/229.22, 248/229.3, 316.4, 237
See application file for complete search history.

(56) References Cited

U.S. PATENT DOCUMENTS

| | | | |
|---|---|---|---|
| 3,030,060 A * | 4/1962 | Breuer | 248/265 |
| 3,486,158 A | 12/1969 | Soltysik et al. | |
| 4,223,972 A | 9/1980 | Olsen | |
| 4,780,096 A | 10/1988 | Franks, Jr. | |
| 4,830,531 A * | 5/1989 | Condit et al. | 403/348 |
| 5,006,074 A | 4/1991 | Franks, Jr. | |
| 5,154,385 A * | 10/1992 | Lindberg et al. | 248/225.11 |
| 5,207,588 A | 5/1993 | Ladouceur et al. | |
| 5,928,006 A | 7/1999 | Franks, Jr. | |
| 6,106,310 A | 8/2000 | Davis et al. | |
| 6,186,799 B1 | 2/2001 | Mello | |

(Continued)

OTHER PUBLICATIONS

International Search Report of the counterpart PCT application No. PCT/US2013/049136, by the International Authority ISA/RU, mailed Oct. 31, 2013.

*Primary Examiner* — Michael P Ferguson
*Assistant Examiner* — Nahid Amiri
(74) *Attorney, Agent, or Firm* — Law Office of Lance C. Venable, PLLC

(57) ABSTRACT

An apparatus for clamping and grounding an upper and lower solar panel mounting rail. The apparatus comprises a fastener with an enlarged end, and a shank, with the enlarged end having one or more sharp protrusions that resemble teeth, and a washer with one or more sharp protrusions, and an opening. When installed, the shank is inserted through the opening of the washer, the sharp protrusions of the enlarged end penetrate either the lower or upper mounting rail and the sharp protrusions of the washer penetrate the other mounting rail while at the same time creating a grounding path through the apparatus.

6 Claims, 3 Drawing Sheets

(56) References Cited

U.S. PATENT DOCUMENTS

| | | | |
|---|---|---|---|
| 6,343,904 B1* | 2/2002 | Wang | F16B 31/021 |
| | | | 411/162 |
| 6,588,711 B2* | 7/2003 | Onishi | 248/49 |
| 6,722,830 B2* | 4/2004 | Forster et al. | 411/188 |
| 7,435,134 B2 | 10/2008 | Lenox | |
| 7,462,043 B2* | 12/2008 | Deisenhofer | 439/97 |
| 7,921,539 B2* | 4/2011 | Woodall et al. | 29/525.01 |
| 8,025,508 B2 | 9/2011 | Parker et al. | |
| 8,152,575 B2 | 4/2012 | Boling et al. | |
| 8,181,926 B2* | 5/2012 | Magno et al. | 248/237 |
| 8,505,864 B1† | 8/2013 | Taylor | |
| 2007/0212935 A1† | 9/2007 | Lenox | |
| 2008/0053517 A1 | 3/2008 | Plaisted et al. | |
| 2008/0146074 A1 | 6/2008 | Deisenhofer | |
| 2009/0000220 A1* | 1/2009 | Lenox | 52/173.1 |
| 2009/0068873 A1 | 3/2009 | Kulig | |
| 2010/0180933 A1 | 7/2010 | Aftanas et al. | |
| 2010/0276558 A1* | 11/2010 | Faust et al. | 248/222.14 |
| 2011/0039430 A1* | 2/2011 | Aftanas | F24J 2/5258 |
| | | | 439/92 |
| 2011/0100433 A1 | 5/2011 | Jonczyk | |
| 2011/0121153 A1* | 5/2011 | Magno, Jr. | F16B 7/187 |
| | | | 248/316.1 |
| 2011/0138585 A1* | 6/2011 | Kmita et al. | 24/522 |
| 2011/0179606 A1 | 7/2011 | Magno, Jr. | |
| 2011/0214365 A1* | 9/2011 | Aftanas | 52/173.3 |
| 2012/0117895 A1 | 5/2012 | Li | |

\* cited by examiner
† cited by third party

ASSEMBLY FOR CLAMPING AND GROUNDING OBJECTS

BACKGROUND OF INVENTION

The present invention relates generally to providing an apparatus for clamping multiple objects together and providing a grounding path between the objects. More specifically, the invention relates to providing a way for the assembly to penetrate metallic objects to better secure the assembly when clamping the objects together while at the same time providing a grounding path between them. One exemplary application of the assembly is to affix a solar panel frame to a rail.

Existing solutions are either unsatisfying in providing sufficient electrical grounding capacity or too complicated to manufacture or install. For example, U.S. Pat. No. 5,006,074 (Franks) teaches an adjustable clamping device using a threaded bolt with an abrading surface to penetrate an outer surface to ground a conductor. The device is not designed to affix two or more objects. US patent application, publication number US 2011/0039430 A1 (Aftanas), discloses a fastening assembly with a metallic bolt and a metallic leaf spring. The metallic leaf spring has at least one tooth projecting from one of the opposing ends. The tooth may penetrate the solar panel frame or the support frame member and ground the solar panel frame. Because the leaf spring is non-structural it only has the capacity to clamp objects together while at the same time providing a grounding path between them.

Another example is US patent application, publication number US 2011/0179606 A1 (Magno et al.), which discloses an assembly for clamping two objects with a single hand and for grounding the objects. Because the assembly has many unnecessary parts (such as a channel member and a clamp with a three-prong first member, a washer, a nut, a threaded bolt, a spring, and a torsion spring) the design is unnecessarily complex. Thus, a less complex assembly that provides grounding and is both easy to use and manufacture is desired.

SUMMARY OF THE INVENTION

The invention is summarized below only for purposes of introducing embodiments of the invention. The ultimate scope of the invention is to be limited only to the claims that follow the specification.

It is an object of this invention to provide a mechanism for fastening two or more objects together and providing a grounding path between the objects that is both easy to manufacture and install.

An embodiment of this invention comprises a fastener and a washer for clamping at least two objects. The fastener may have a shank and an enlarged end with one or more raised portions for penetrating a first object. The washer has an opening and also one or more raised portion for penetrating at least one other object. The raised portion may be a tooth or other similar structure as long as it has a sharp ridge, or any kind of configuration that is suitable for penetrating metallic surfaces. When installed, the shank is disposed through the opening of the washer.

An example of the fastener is a t-bolt comprising a head (an enlarged portion) and a shank, with teeth protruding from the head. The embodiment may be used to clamp a solar panel frame to a rail by enabling the teeth of the t-bolt to penetrate into the rail and the teeth of the washer penetrating into the solar panel frame so that the embodiment provides a secure grip. If a proper force is applied during assembly, the teeth of the t-bolt may penetrate through the coated surface of the metallic rail while the teeth of the washer may penetrate through the coated surface of the metallic solar panel frame. A grounding path is then formed from the solar panel frame to the rail via the washer and the t-bolt.

In this embodiment, the t-bolt and the washer may be coupled by the external thread of the t-bolt and internal thread of the washer's opening. Alternatively, a threaded nut may be used to fasten the washer to the t-bolt. The washer may be flat or may comprise of one or more flanges. The teeth may be located on the flange, the flat portion, or both. The washer may also have one or more elongated side portions which extend downward (toward the enlarged end of the fastener when assembled). The side portion(s) may be located on the same side of the flange(s).

Another embodiment is an assembly that comprises a fastener and a washer used to clamp at least three metallic objects. The fastener comprises an enlarged end with at least one raised portion and a shank. The washer comprises multiple raised portions and an opening. When installed, the raised portions of the fastener penetrate the first object, at least one raised portion of the washer penetrates the second object, and at least one raised portion of the washer penetrates the third object. The assembly provides one or more grounding paths from one object to another.

Additionally, the washer in this embodiment may have at least one elongated side portion which extends downward (toward the enlarged end of the fastener when assembled). The side portion may be located on the same side of a flange if the washer also has one or more flanges. The side portion may be used to separate objects that are contacted by the washer.

For example, an assembly with a metallic t-bolt with a shank and a head that has teeth and a metallic washer with an opening and teeth may be used to couple two metallic solar panel frames and a metallic rail. An electrical grounding path from the rail to a solar panel frame is formed when the teeth of the t-bolt penetrate into the surfaces of the rail and the teeth of the washer penetrate one of the solar panel frames. Similarly, the assembly can create a grounding path between the panel frames when the teeth of the washer penetrate both the solar panel frames.

Similarly, an embodiment may be used to clamp two or more objects with the raised portions of the fastener and the raised portion of the washer contact the same objects. Therefore, there are at least two grounding path between two affixed objects—one from the first object through the washer alone to the second object, and the other from the first object through the washer and the fastener and finally to the second object. An example is when the assembly is used to clamp two metallic solar panel rails and provide grounding path between them, without the metallic rail at the bottom.

This invention may also contain a method for affixing a metallic object to another metallic object. An exemplary method may comprise steps of using one of the aforementioned assemblies to clamp two or more objects and thus may create at least an electrical grounding path between the objects.

A person with ordinary skill in the relevant art would know that any shape or size of the fastener or the washer may be adopted as long as the assembly can be used to clamp two or more objects and provide a grounding path. Any combinations of suitable number, shape, and size of raised portions of the fastener and the washer may be used. Also, any materials suitable to achieve the object of the current invention may be chosen, such as stainless steel or metallic materials.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF EXEMPLARY EMBODIMENTS

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the inventions is not limited to the examples that are described below.

Figure 1:
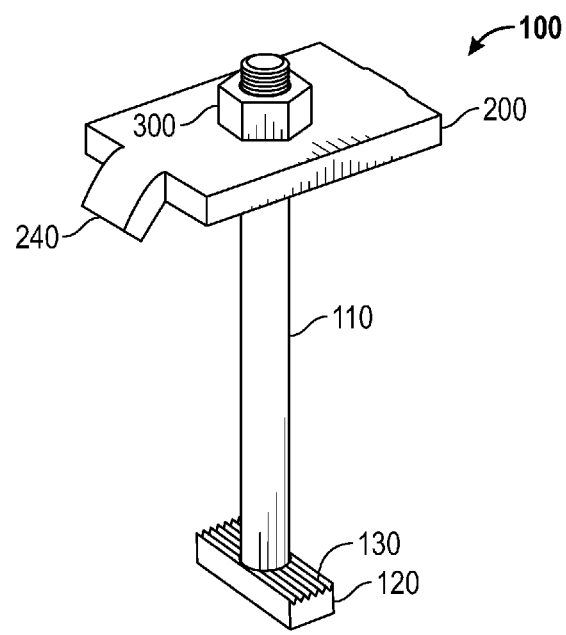
FIG. 1 shows the profile view of an embodiment of the apparatus.
Figure 2A:
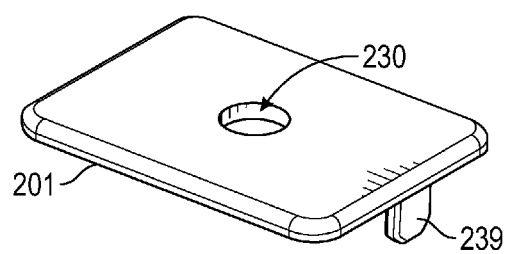
FIGS. 2A & 2B illustrates the upper and lower sides of the washer in FIG. 1.
Figure 2B:
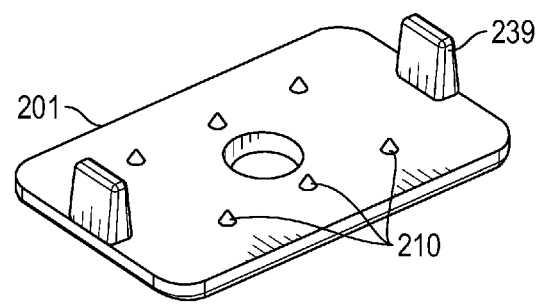

FIG. 1 illustrates an embodiment of the assembly for securing solar panel mounting rails a fastener 100, which comprises a shank 110 and an enlarged end 120 (also referred to as a "head"), on which there are multiple raised portions 130, which are typically sharp ridges The embodiment also contains a washer 200 and a nut 300. The washer 200 has two elongated side portions 240 which extend downward. The elongated side portions 240 are also referred to as tabs and are located on the edge of the washer 200. FIGS. 2A and 2B illustrate an alternate embodiment of the washer 200 in FIG. 1 that provides the same function. The washer 201 has an opening 230 (as shown in FIG. 2 and is also present in FIG. 1), through which the shank 110 is inserted. The upper side and lower side or surface of the washer 201 are shown in FIG. 2. The lower side of washer 201 also includes multiple raised portions 210, which resemble sharp teeth-like structures capable of penetrating metallic structures such as the solar panel mounting rails. Opposite edges of the washer 201 also include tabs 239 that extend downward as shown in FIG. 2A.

Figure 3:
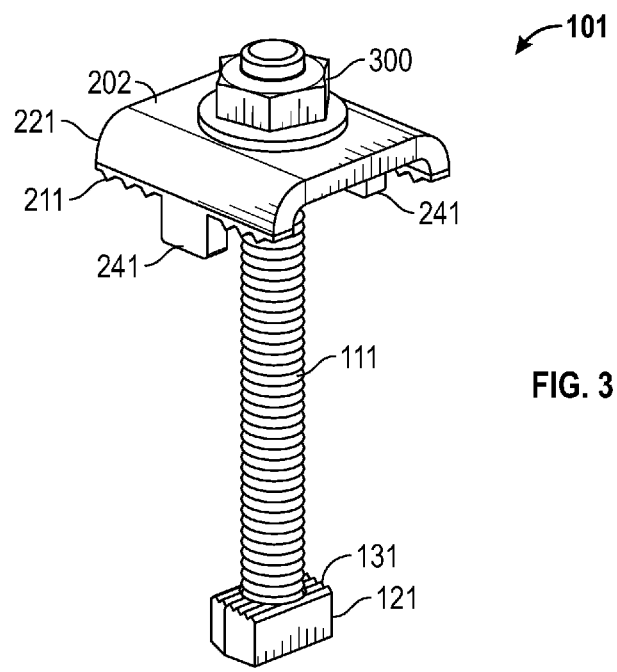
FIG. 3 illustrates an alternate embodiment of the assembly.

FIG. 3 illustrates another embodiment of this invention. In this embodiment, the shank 111 is externally threaded, the washer 201 further comprises two flanges 220 that are bent downward, and the raised portions 211 are located on the edges of flanges 220. This embodiment also has elongated side portions 241 on the flanges 220. The elongated side portions 241 are also referred to as tabs.

Figure 4A:
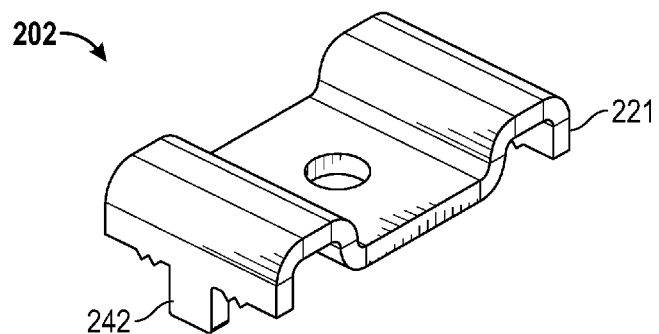
FIGS. 4A & 4B illustrates an alternate embodiment of the washer.
Figure 4B:
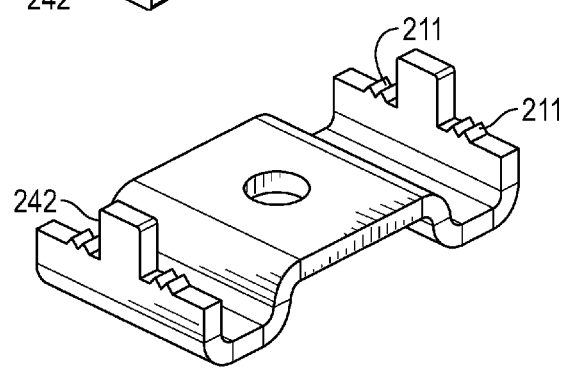

An alternate embodiment of a washer with flanges is illustrated in FIGS. 4A & 4B showing the embodiment in top and bottom views. In this embodiment, the washer 202 has arch-shaped flanges 221. The raised portions 211 and the elongated side portions 242 are also located on the edges of the flanges 221. Otherwise the various elements work in accordance as described above.

Figure 5:
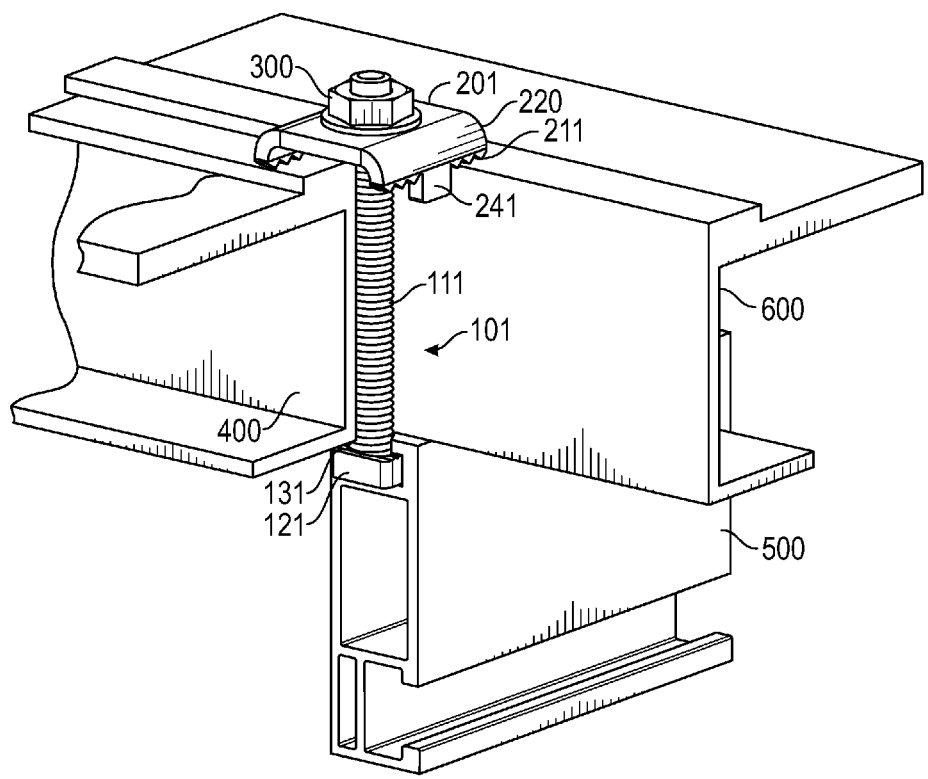
FIG. 5 shows a cross-section view when the embodiment in FIG. 3 is utilized for its intended purpose.

FIG. 5 shows a cross section when the exemplary assembly in FIG. 3 is used to clamp two parallel solar panel mounting rails 400 and 600, which is typically a frame that is an elongated channel for receiving a solar panel (also referenced as a solar panel mounting rail or a frame) and a rail (also referenced as a rail guide) 500 that runs under and perpendicular to the mounting rails 400 and 600. The threaded shank 111 is disposed through the openings of the washer 201 and the nut 300. The enlarged end 121 of the fastener 101 is in contact with the rail 500, with the sharp ridges 131 penetrating into the rail 500. The washer 201 contacts the rails 400 & 600 at the flanges 221, so that the raised portions 211 can penetrate into the two rails 400 and 600. An elongated side portion or tab 241 of the washer 201 is located on the flange 221 and is placed between rails 400 and 600 to separate them when they are adjacent to each other. If the mounting rails 400 and 600, the fastener 101, and the washer 201 are of suitable materials, the assembly forms an electrical grounding path between the rails 400 and 600 through the washer 201, between the mounting rail 400 and the rail guide 500 through the washer 201 and the fastener 101, and between the mounting rail 600 and rail guide 500 through the washer 201 and the fastener 101. It is also understood that the alternate embodiments of the fastener 100 with either washer 200 or 201, or the washer 101 with either washer 201 or 202 can be utilized to secure the mounting rails 400 and 600 to the rail guide 500, provide space between adjacent mounting rails, and provide as electrical path between the rails 400 and 600 and the rail guide 500.

What is claimed is:

1. An assembly for affixing a first object to a second object and a third object and providing a grounding path between the objects comprising:
    a. first and second frames each comprising an elongated channel for receiving a solar panel;
    b. a rail guide;
    c. an electrically conductive fastener;
        i. the fastener comprising a shank homogeneous with an enlarged end such that the shank terminates at a nut end and the enlarged end further comprises a top and a bottom surface wherein the top surface comprises at least one raised portion for penetrating a surface of the rail guide;
    d. an electrically conductive washer comprising:
        i. a central opening for allowing the shank to pass through the washer,
        ii. a pair of tabs with each respective tab being on a respective edge of the washer such that the pair of tabs extend downward in the direction of the enlarged end, and
        iii. at least one raised portion on each respective edge of the washer for penetrating a surface of the first and second frames respectively.

2. The assembly of claim 1, wherein the respective edges are flanges.

3. The assembly of claim 1 wherein the opening of the washer further comprises an internal thread.

4. The assembly of claim 1, wherein the shank further comprises an external thread for engaging the opening of the washer.

5. The assembly of claim 1, wherein the fastener and washer are metallic.

6. The assembly of claim 1, wherein the assembly further comprises a nut for securing the washer to the first and second frames respectively.

* * * * *